US011966187B2

(12) United States Patent
Sugiyama

(10) Patent No.: US 11,966,187 B2
(45) Date of Patent: Apr. 23, 2024

(54) FEEDING APPARATUS WITH CONTROL OF ION IRRADIATION UNIT THAT IRRADIATES SHEET

(71) Applicant: CANON KABUSHIKI KAISHA, Tokyo (JP)

(72) Inventor: Tadahisa Sugiyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/830,469

(22) Filed: Jun. 2, 2022

(65) Prior Publication Data

US 2022/0397858 A1 Dec. 15, 2022

(30) Foreign Application Priority Data

Jun. 14, 2021 (JP) ................................ 2021-098907

(51) Int. Cl.
*G03G 15/00* (2006.01)
*G03G 15/02* (2006.01)
*G03G 21/20* (2006.01)

(52) U.S. Cl.
CPC ..... *G03G 15/6591* (2013.01); *G03G 15/0266* (2013.01); *G03G 15/0275* (2013.01); *G03G 15/0283* (2013.01); *G03G 15/0291* (2013.01); *G03G 15/5029* (2013.01); *G03G 15/6588* (2013.01); *G03G 21/203* (2013.01); *G03G 2215/00421* (2013.01); *G03G 2215/00649* (2013.01); *G03G 2215/00654* (2013.01); *G03G 2215/00751* (2013.01)

(58) Field of Classification Search
CPC .......... G03G 15/0266; G03G 15/0275; G03G 15/0283; G03G 15/0291; G03G 15/5029; G03G 15/6588; G03G 15/6591; G03G 21/203; G03G 2215/00421; G03G 2215/00649; G03G 2215/00654; G03G 2215/00751
See application file for complete search history.

(56) References Cited

U.S. PATENT DOCUMENTS

2008/0290591 A1 11/2008 Shimizu
2016/0187803 A1* 6/2016 Matsudaira ........ G03G 15/0266 399/341

FOREIGN PATENT DOCUMENTS

JP 2009-001418 A 1/2009
JP 2014-206690 A 10/2014
JP 2019-167169 A 10/2019

* cited by examiner

*Primary Examiner* — Joseph S Wong
(74) *Attorney, Agent, or Firm* — Venable LLP

(57) ABSTRACT

A feeding apparatus includes a feeding unit, an ion generating unit and a controller. The ion generating unit irradiates the sheet fed by the feeding unit with the ion. The controller acquires an information on the fed sheet and to controls the ion generating unit. The controller operates the ion generating unit in a case that the information of the sheet is a first information, and does not operate the ion generating unit in a case that the information of the sheet is a second information.

7 Claims, 5 Drawing Sheets

| PAPER TYPE | BASIS WEIGHT [g/m²] | HUMIDITY [%] | |
|---|---|---|---|
| | | ≦H | >H |
| PLAIN A | $\leqq M_1$ | OPER | NON-OPER |
| PLAIN B | $> M_1$ | NON-OPER | NON-OPER |
| COATED A | $\leqq M_2$ | OPER | NON-OPER |
| COATED B | $> M_2$ | NON-OPER | NON-OPER |
| SYNTHETIC | OPERATION | | |

Fig. 5

FEEDING APPARATUS WITH CONTROL OF ION IRRADIATION UNIT THAT IRRADIATES SHEET

FIELD OF THE INVENTION AND RELATED ART

The present invention relates to a feeding apparatus for feeding sheets.

For example, sheets fed by image forming apparatuses such as copiers, printers, and multifunctional machines become charged during the process of feeding and image formation. If the amount of charge on the sheets is too high, for example, when sheets are ejected and stacked on an ejection tray, the sheets may not be aligned neatly with each other. To avoid such issues, it is desirable to remove (eliminate) the static charge from the sheet to a level below a predetermined charge level.

For this reason, it has been proposed that an image forming apparatus be provided with a static remover that eliminates static electricity and an electrostatic sensor that detects the amount of charge on a sheet and that the static remover performs static elimination based on the detection of the electrostatic sensor (see Japanese Laid-Open Patent Application No. 2009-001418). In addition, it is also proposed to provide an ion generating unit that generates ions as a static remover, and to control the number of ions generated by the ion generating unit based on the image formation information when an image is formed on a sheet and the paper type information set (see Japanese Laid-Open Patent Application No. 2014-206690).

However, the above Japanese Laid-Open Patent Application No. 2009-001418 controls the static remover based on the detection of an electrostatic sensor, so it is necessary to install an electrostatic sensor, which makes the configuration of the device more complicated and costly. In addition, the Japanese Laid-Open Patent Application No. 2014-206690 controls the ion generating unit based on image formation information and paper type information, but the ion generating unit is kept running. That is, the ion generating unit is kept running even when plain paper with a basis weight above a certain value is used, for example, where static elimination of the sheet is not necessary, or when the image forming apparatus is used in a humid environment where the sheet is relatively difficult to be charged. The ion generating unit operates on the principle of ionizing molecules in the air by a corona discharge between electrodes to which high voltage is applied. Therefore, if the ion generating unit continues to operate, the life of the discharging electrodes is shortened due to consumption of the electrodes, and performance degradation due to the formation of oxide film on the electrodes and adhesion of dust is also likely to occur, resulting in an issue of shortened maintenance intervals.

SUMMARY OF THE INVENTION

The present invention is intended to provide a feeding apparatus that allows for longer maintenance intervals.

The present invention is a feeding apparatus comprising a feeding unit configured to feed a sheet, an ion generating unit configured to generate ions with which the sheet fed by said feeding unit is irradiated, and a controller configured to acquire an information on the fed sheet and to control said ion generating unit, wherein said controller operates said ion generating unit in a case that the information of the sheet is a first information, and does not operate said ion generating unit in a case that the information of the sheet is a second information.

Further features of the present invention will become apparent from the following description of exemplary embodiments (with reference to the attached drawings).

BRIEF DESCRIPTION OF THE DRAWINGS

FIG. 5 is a table showing the relationship between sheet information and the operation/deactivation of the ion generating unit.

DESCRIPTION OF THE EMBODIMENTS

First Embodiment

[Configuration of the Image Forming Apparatus]

Figure 1:
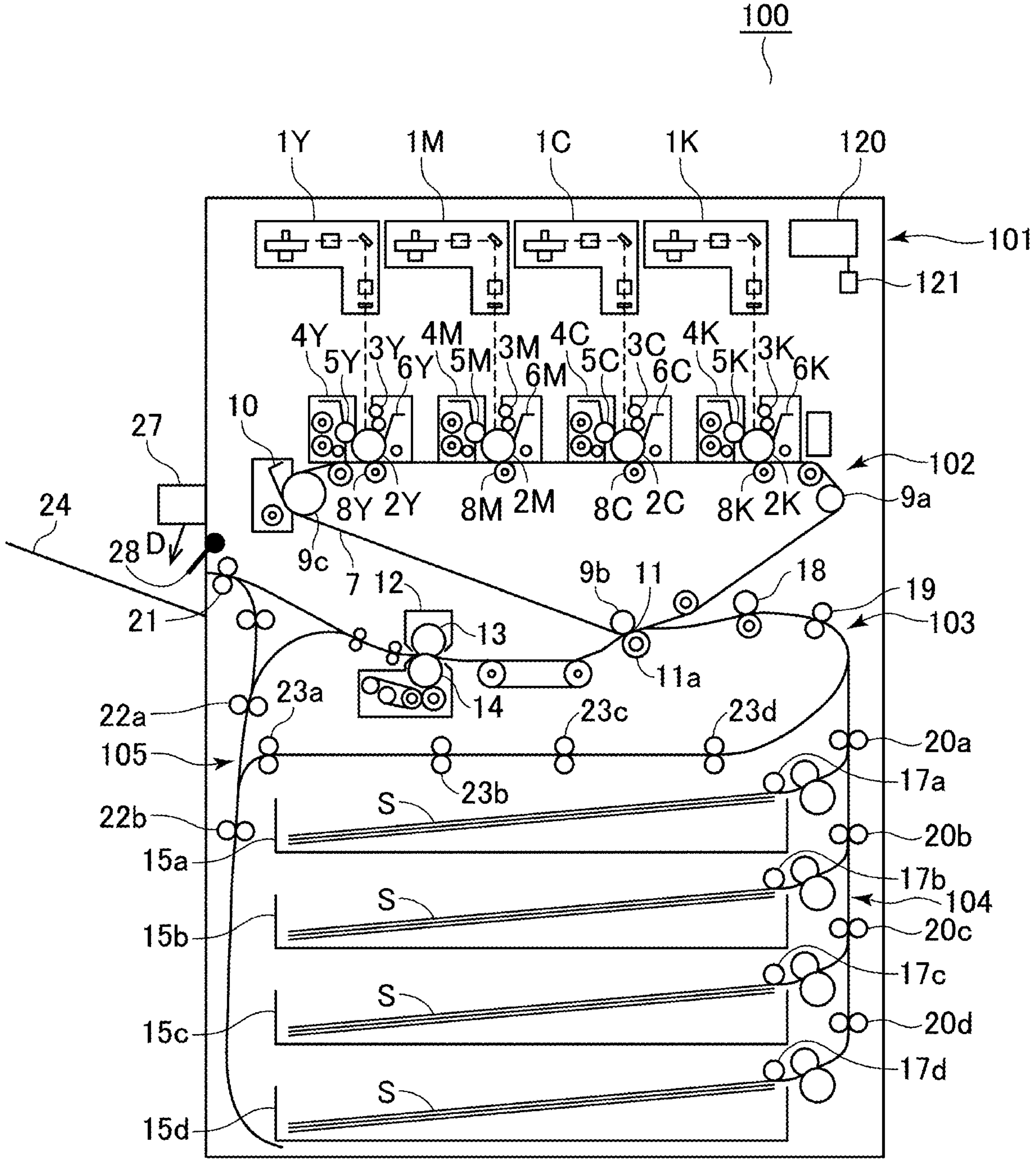
FIG. 1 is a schematic view of the image forming apparatus according to the present embodiment.

The first embodiment for implementing the present invention is described below using FIG. 1 and FIG. 2. As shown in FIG. 1, the image forming apparatus (feeding apparatus) 100, which is a color laser printer, includes an apparatus main body 101. The apparatus main body 101 has, roughly speaking, an image forming portion 102 that forms an image on a sheet S, a sheet feeding portion 103 that feeds the sheet S to the image forming portion 102 and feeds the sheet S to the outside of the apparatus main body 101 until it is discharged, and a static remover 30 (see FIG. 2).

The image forming portion 102 is equipped with four process stations 4Y, 4M, 4C, and 4K, which are arranged in an abbreviated horizontal direction and form toner images in four colors: yellow (Y), magenta (M), cyan (C) and black (Bk), respectively. The image forming portion 102 is also equipped with scanner units 1Y, 1M, 1C, and 1K.

Here, process stations 4Y, 4M, 4C, and 4K are equipped with photosensitive drums 2Y, 2M, 2C, and 2K, which are image bearers that carry toner images in four colors (yellow, magenta, cyan, and black, respectively) and are driven by an unshown stepping motor. In addition, process stations 4Y, 4M, 4C, and 4K are equipped with charging rollers 3Y, 3M, 3C, 3K, developing portions 5Y, 5M, 5C, 5K, and cleaner portions 6Y, 6M, 6C, 6K that clean photosensitive drums 2Y, 2M, 2C, 2K along the rotation direction. The charging rollers 3Y, 3M, 3C, 3K, developing portions 5Y, 5M, 5C, 5K, and cleaner portions 6Y, 6M, 6C, 6K, etc. are arranged along the rotation direction around the photosensitive drums 2Y, 2M, 2C, and 2K respectively.

The image forming portion 102 includes an intermediate transfer belt 7, primary transfer rollers 8Y, 8M, 8C, 8K, a secondary transfer outer roller 11*a*, and a fixing device 12. The intermediate transfer belt 7 is driven to rotate along the direction of the array of each process station 4Y, 4M, 4C, 4K shown by the arrows in synchronization with the peripheral speed of the photosensitive drum 2Y, 2M, 2C, 2K. The intermediate transfer belt 7 is subjected to moderate tension by a tension roller 9*c* which moderately tensions a driving roller 9*a*, a secondary transfer inner roller 9*b*, and an urging spring force (unshown).

The intermediate transfer belt 7 has four primary transfer rollers 8Y, 8M, 8C, and 8K, which nip the intermediate transfer belt 7 together with four photosensitive drums 2Y, 2M, 2C, and 2K, respectively, on the inside and constitute the primary transfer portion. These primary transfer rollers 8Y, 8M, 8C, 8K are connected to a transfer bias power supply (not shown). A secondary transfer outer roller 11*a* is arranged opposite the secondary transfer inner roller 9*b* to form the secondary transfer portion 11. This secondary transfer outer roller 11*a* contacts the lowest surface of the intermediate transfer belt 7, and also nips and feeds the sheet S fed by the registration roller pair 18 together with the intermediate transfer belt 7.

A fixing device 12 fixes the toner image formed on the sheet S via the intermediate transfer belt 7 to a sheet S. It has a fixing roller 13 that heats the sheet S and a pressurizing roller 14 that presses the sheet against the fixing roller 13. The fixing roller 13 is formed in a hollow shape and contains a heater inside (not shown).

On the other hand, the image forming apparatus 100 has a sheet feeding portion 104 that feeds sheets S and a sheet feeding portion 103 that feeds sheets fed by the sheet feeding portion 104. The sheet feeding portion 104 is installed in the lower part of the printer main body and is equipped with paper feeding cassettes 15*a*, 15*b*, 15*c*, 15*d* for storing sheets. The sheet feeding portion 104 also includes pick-up rollers 17*a*, 17*b*, 17*c*, 17*d* that feed the sheets S stored in the paper cassettes 15*a*, 15*b*, 15*c*, 15*d*.

The sheet feeding portion 103 is equipped with a feeding roller pair 20*a*, 20*b*, 20*c*, 20*d* that feed the sheet S fed from each of the pickup rollers 17*a*, 17*b*, 17*c*, 17*d*, a pre-registration roller pair 19, and a registration roller pair 18. The sheet feeding portion 103 includes a discharge roller pair 21 as a discharging portion which feeds the sheet S on which the image has been fixed by the fixing device 12 and discharges it to the stack tray 24 as the sheet stacking portion outside the image forming apparatus 100. Furthermore, the sheet feeding portion 103 is provided with a re-feeding portion 105. The re-feeding section 105 is provided with a reversing roller pairs 22*a*, 22*b* and re-feeding roller pairs 23*a*, 23*b*, 23*c*, 23*d*.

Figure 2:
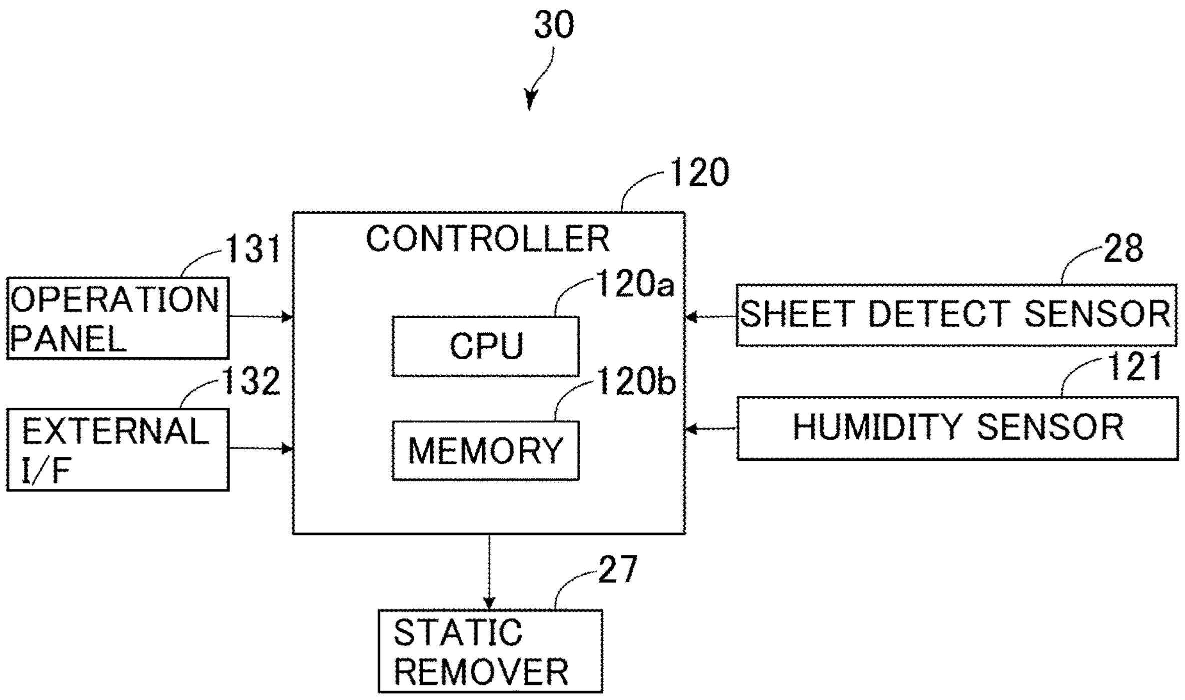
FIG. 2 is a block diagram showing the structure of the static remover according to the present embodiment.

As shown in FIGS. 1 and 2, static remover 30 is equipped with a sheet detecting sensor 28, which detects the presence or absence of a sheet as a sheet detecting portion, and a static removing portion 27, which is located downstream of the ejection roller pair 21 in the sheet feeding direction, to remove static from the sheet S being fed by the ejection roller pair 21. The static removing portion 27 is composed of an ion generating unit that generates ions when activated and irradiates ions toward the sheet S that is discharged and stacked in the stack tray 24 as indicated by arrow D.

The static remover 30 can also control the static removing portion 27, as shown in FIG. 2, and in particular, has a controller 120 that controls the operation and deactivation (non-operation) of the static removing portion 27. The controller 120 has a CPU 120*a* as an arithmetic unit and a memory 120*b* as a storage unit. The controller 120 also accepts copy and print job s entered by the user from the operation panel 131 or from a computer (not shown) via the external interface 132. These jobs include information on sheet type and size, from which at least the information on sheet type is obtained and stored in memory 120*b* as sheet information. The sheet type information is pre-set in association with the feeding cassettes 15*a* to 15*d*, and the sheet information included in the job may be information on which feeding cassette sheets are used.

The controller 120 is electrically connected to the humidity sensor 121 as the environment information detecting portion and receives a signal of humidity as the value of environment information of the apparatus 100 (static remover 30) based on the signal from the humidity sensor 121. The humidity sensor 121 should be located inside the apparatus main body 101 because it is preferable to be located in a position to detect the humidity of the environment in which the sheet S is placed, rather than detecting the humidity at the area where the static remover 30 is located.

[Image Forming Operation of the Image Forming Apparatus]

Next, the image forming operation of the image forming apparatus 100 will be described. When image signals are input to scanner units 1Y, 1M, 1C, 1K from a computer (not shown) or another device, a laser beam corresponding to the image signals is irradiated from scanner units 1Y, 1M, 1C, 1K onto the photosensitive drum at each process station 4Y, 4M, 4C, 4K. At this time, the surfaces of photosensitive drums 2Y, 2M, 2C, 2K are uniformly charged to a predetermined polarity and potential by charging rollers 3Y, 3M, 3C, 3K, and a latent electrostatic image is formed on the surface by irradiating a laser beam from scanner unit 1Y, 1M, 1C, 1K.

After this, this electrostatic latent image is developed by developing portions 5Y, 5M, 5C, 5K to form four-color toner images of yellow, magenta, cyan, and black on the photosensitive drum at each process station 4Y, 4M, 4C, 4K. The four-color toner image is then sequentially transferred onto the intermediate transfer belt 7 by the primary transfer bias applied to primary transfer rollers 8Y, 8M, 8C, and 8K to form a full-color toner image on the intermediate transfer belt 7. The toner remaining on the surface of the photosensitive drum after the toner image transfer is removed by cleaner portions 6Y, 6M, 6C, 6K.

In parallel with this toner image forming operation, the sheet S stored in the feeding cassette selected by controller 120 among the paper cassettes 15*a* to 15*d* is started to be fed by the pickup roller 17 corresponding to that feeding cassette. The fed sheet S is fed to the registration roller pair 18 by the feeding roller pairs 20*a*-20*d* and the pre-registration roller pair 19 in the sheet feeding portion 103, and the skew is corrected. After this, the sheet S is fed to the secondary transfer section 11 after being timed by the registration roller pair 18. In the secondary transfer portion 11, a positive polarity bias is applied to the secondary transfer outer roller 11*a*, and the full-color toner image on the intermediate transfer belt 7 is secondarily transferred to the fed sheet S. The remaining toner on the intermediate transfer belt 7 is collected in the cleaner container 10.

After the toner image is transferred, the sheet S is fed to the fixing device 12, where it is heated and pressurized by the fixing roller 13 and the pressure roller 14 to fix the toner image on the surface. After this, the sheet S with the full-color toner image fixed is discharged by the discharge roller pair 21 toward the stack tray 24. When images are formed on both sides of a sheet S, the sheet S with an image formed on one side is reversed in the sheet feeding direction and front and back by the reversing roller pair 22*b* of the re-transfer section 105. It is then fed to the registration roller pair 18 by the re-transfer roller pairs 23*a*-23*d*. The toner image is then fed by the registration roller pair 18 to the secondary transfer section 11, where the toner image is transferred to the second side, which is the back side. After the toner image is fixed by the fixing device 12, the sheet S with the toner image transferred on the second side is discharged to the stack tray 24 by the discharging roller pair 21. After fixing an image on a sheet S, when the front and back sides of the sheet S are to be reversed and discharged to the stack tray 24, the sheet S is reversed in the sheet feeding direction and front and back sides by the reversing roller pair 22*a*, and then discharged from the discharging roller pair 21.

[Operation Control of the Static Removing Portion]

The operation control of the static removing portion in the first embodiment is explained using FIG. 2 with reference to FIG. 1. First, the reason why the sheet S is charged during the image forming process in the image forming apparatus 100 is explained. In the secondary transfer portion 11 described above, the toner that forms the visible image transferred to the sheet S is negatively charged. On the other hand, the secondary transfer outer roller 11*a* has a high voltage applied to it from the transfer high voltage power supply (not shown), so the sheet S is positively charged in the secondary transfer portion 11 and the toner is transferred to the sheet S as a toner image. The sheet S is charged by this transfer process. Although the description here assumes that the toner is negatively charged, some electrophotographic processes use different charging states. However, even if the charging of the sheet S and the toner are reversed, there is no change in the fact that the toner image is transferred to the sheet S using Coulomb force, and the sheet S is charged in the transfer process. In addition to the above transfer process, sheet S is also charged by friction and peeling between sheets as they are fed from feeding cassettes 15*a* to 15*d*, by friction and peeling between sheet S and the materials of the feeding path during the feeding operation described above, and by friction and peeling between sheet S and the respective feeding rollers.

Thus, the sheet S is charged when it is fed in the image forming apparatus 100 or when the toner image is transferred. If the sheet becomes heavily charged, especially in the stack tray 24, inconsistencies occur, and the static must be removed from the sheet. The static remover 30 in the first embodiment has the function of neutralizing the charge of the charged sheet S by generating ions from the static removing portion 27, and thus has the effect of removing static from the charged sheet. The following is a description of the operational control of the static removing portion 27 of the static remover 30.

Figure 3:
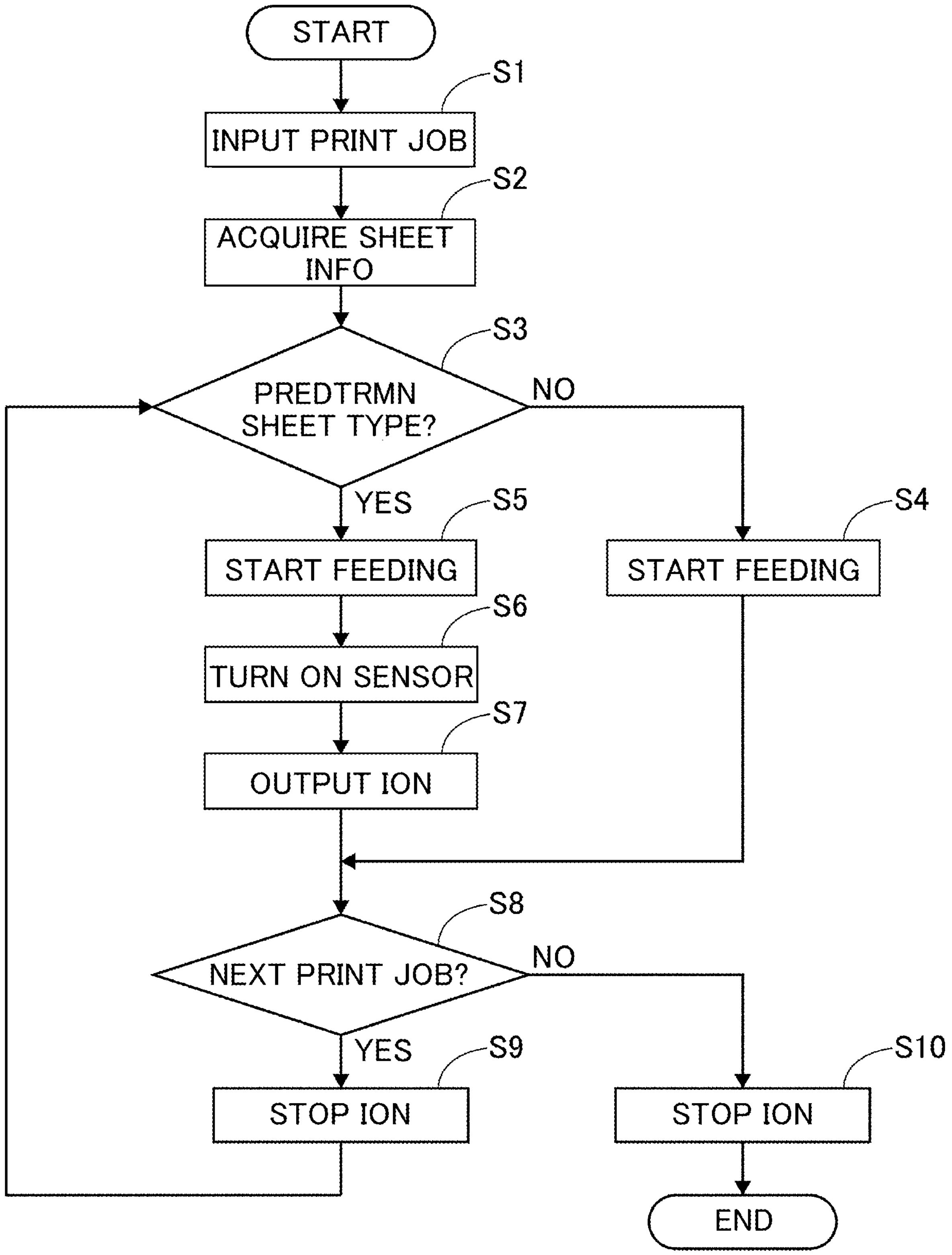
FIG. 3 is a flowchart showing the operational control of the ion generating unit according to the first embodiment.

First, when using the image forming apparatus 100, the user associates sheet information, such as size and paper type, with the feeding cassettes 15*a*-15*d* and stores them in memory 120*b* via an external interface 132 from the operation panel 131 or a computer (not shown). The CPU 120*a* of controller 120 initiates the operation control of the static removing portion 27 as shown in FIG. 3 and accepts the user's input of a print job for printing or copying to the image forming apparatus 100 via the operation panel 131 or external interface (S1). The CPU 120*a* then obtains sheet type information from the sheet information set in the memory 120*b* as described above, for example, from the information on the feeding cassettes 15*a*-15*d* specified by the print job (S2).

Then, it determines whether or not the sheet type information obtained above is the first information (S3). The predetermined sheet type is a type that is more easily charged than other types (second information), such as plain paper with a basis weight greater than a predetermined amount, coated paper with a basis weight greater than a predetermined amount, and synthetic paper, and the like.

Here, in general, sheets made of plastic materials such as PET or processed on the surface are easily charged. In other words, they are sheets of aluminum evaporated paper called synthetic paper or water-resistant paper. These sheets of synthetic paper have higher electrical resistivity than plain paper or coated paper produced with pulp. Even for plain or coated paper, the ease of electrification varies depending on the basis weight. In general, the thinner the paper, the higher the electrical resistivity tends to be, and the thinner the paper, the easier it is to be charged.

Therefore, if the acquired sheet type information is the predetermined sheet type (first sheet) (S3 YES), the sheet S is first passed through (fed) (S5). Then, when the sheet S passes through a fixing device 12 and a leading edge of the sheet S reaches the sheet detection sensor 28, the sheet detection sensor 28 is turned on (S6).

When the sheet detection sensor 28 is turned on, the controller 120 starts generating (outputting) ions by the static removing portion 27 and directs the ions toward the sheet S discharged from the discharging roller pair 21 (S7). In other words, ion emission from the static removing portion 27 begins at the timing when the leading edge of the sheet S reaches the sheet detection sensor 28 located at the paper exit. It then determines whether or not there is a print job that forms images on the next sheet S (hereinafter simply referred to as "next print job") (S8), and if there is a next print job (S8 YES), it stops the generation (output) of static removing portion 27 ions (S9) and returns to step S3. If there is no next print job (S8 NO), the generation (output) of ions in the static removing portion 27 is stopped (S10) and this control is terminated.

On the other hand, if the sheet type information obtained in step S3 is not the predetermined sheet type (i.e., the second sheet is less electrically charged than the first sheet) (S3 NO), the sheet S is simply fed (conveyed) (S4). In other words, since this sheet S is difficult to be charged (low charge), the static removing portion 27 is left inactive. Then, similarly, it determines whether there is a next print job (S8), and if there is a next print job (S8 YES), it stops the generation (output) of static removing portion 27 ions (S9), based on the fact that a predetermined time has passed since it started operation, for example, and returns to step S3. If there is no next print job (S8 NO), similarly, for example, based on the fact that a predetermined time has passed since the start of operation, the generation (output) of ions in the static removing portion 27 is stopped (S10) and this control is terminated.

In the first embodiment, the static removing portion 27 can be operated for sheet S that requires static removal, especially to reduce the number of inconsistencies of sheet S that are discharged to the stack tray 24.

By the way, the static removing portion 27, which is an ion generating unit, operates on the principle of ionizing molecules in the air by a corona discharge between electrodes to which a high voltage is applied. Therefore, there is a concern that if the static removing portion 27 continues to operate, the life of the discharge electrodes will shorten due to consumption of the electrodes, and the performance degradation due to the formation of oxide film on the electrodes and adhesion of dust will also easily progress, resulting in shorter maintenance intervals.

In the present first embodiment, the static removing portion 27 is deactivated for sheets S that do not require static removal. Therefore, the life of static removing portion 27 can be lengthened, performance degradation can be reduced, and the maintenance interval can be lengthened. This makes it possible to achieve both long life of the static removing portion 27 and static removal performance, and because the static removing portion 27 has a longer life, the running cost can also be reduced. And since the static removing portion 27 can be controlled to operate or not according to sheet information (sheet type) without using an expensive and complicated configuration such as an electrostatic sensor, it is possible to prevent cost increases.

When a sheet detection sensor 28 is provided to operate the static removing portion 27, the static removing portion 27 is operated in response to the detection of a sheet S by the sheet detection sensor 28. This allows the static removing portion 27 to operate only when a sheet S is fed into the static removing portion 27, thereby extending the service life of the static removing portion 27.

By performing the control described above each time a print job is sent by the user, the appropriate static removing portion 27 can be selected to be activated or deactivated for each print job, even if multiple print job s are simultaneously executed on the image forming apparatus 100. Thus, each print job can be executed without running the static removing portion 27 unnecessarily.

Second Embodiment

Figure 4:
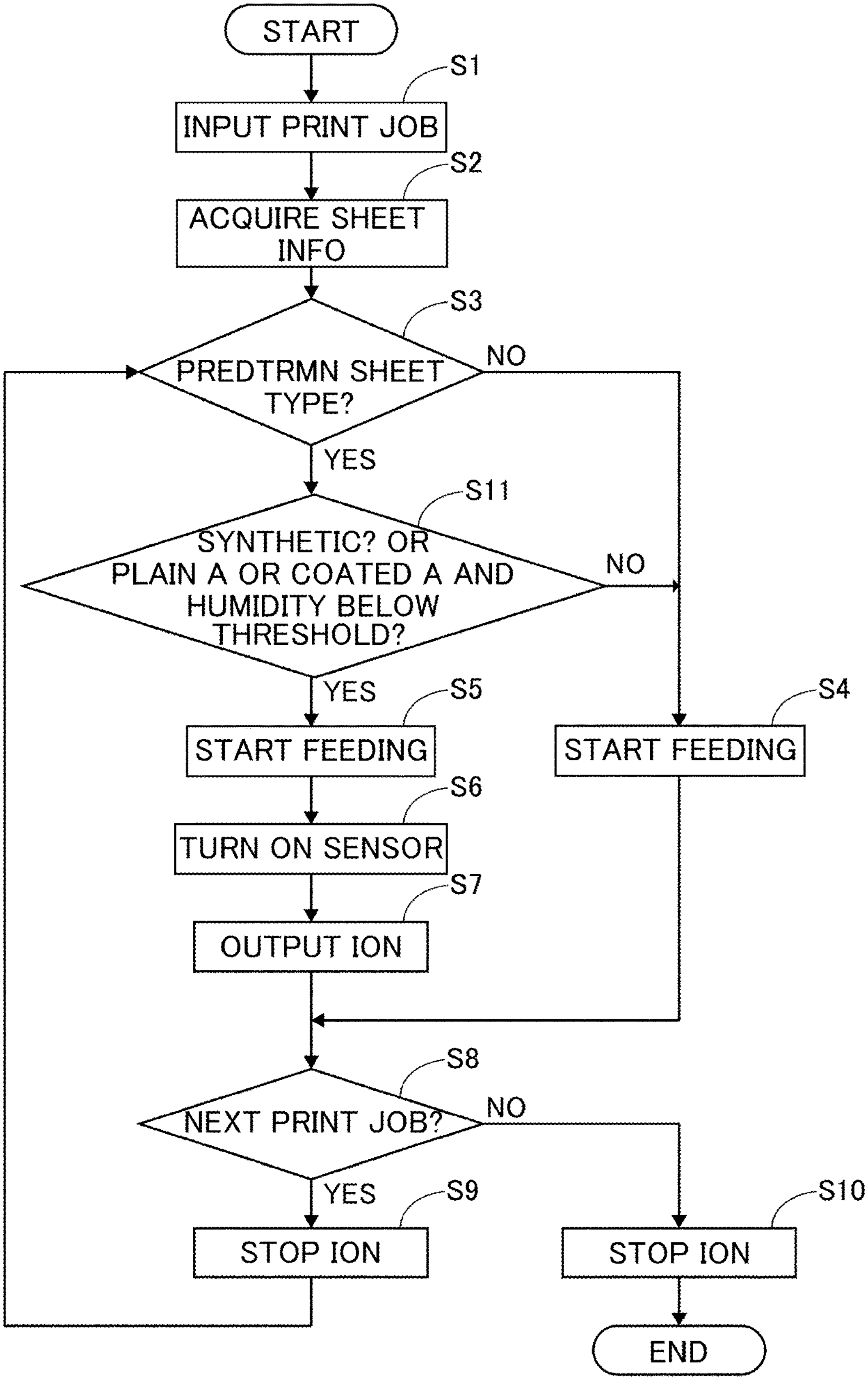
FIG. 4 is a flowchart showing the operational control of the ion generating unit according to the second embodiment.

Next, the second embodiment, which is a partial modification of the above first embodiment, is described using FIG. 4 and FIG. 5. In the description of this second embodiment, the same symbols are attached to the parts similar to those of the above first embodiment, and the description is omitted.

Sheet S has different electrical resistivity depending on the sheet type and basis weight, and the electrical resistivity of the sheet varies depending on the moisture content of the sheet, so the amount of charging of the sheet varies with the effect of humidity. That is, since the electrical resistivity of a sheet increases with lower humidity, the lower the humidity environment, the greater the amount of charge on the sheet S is likely to be. Therefore, in the second embodiment, the operation and deactivation of the static removing portion 27 are controlled more appropriately by using not only the information on the sheet type but also the information on the humidity at which the image forming apparatus 100 (static remover 30) is placed.

In detail, as shown in FIG. 4, the CPU 120*a* of the controller 120 initiates the operation control of the static removing portion 27 and accepts the user's input of a print job for printing or copying to the image forming apparatus 100 via the operation panel 131 or an external interface (S1). The CPU 120*a* then obtains the sheet type from the sheet information set in the memory 120*b* as described above, for example, from the information of the feeding cassettes 15*a* to 15*d* specified by the print job (S2).

Then, it determines whether or not the sheet type information obtained above is the first information (S3). In the second embodiment, the predetermined sheet types are, for example, plain paper A, coated paper A, and synthetic paper as shown in FIG. 5, and the sheet types other than the predetermined sheet types (second information) are, for example, plain paper B and coated paper B. Plain paper A is plain paper with a basis weight of M1 [g/m2] or less (e.g., 60 [g/m2]), and conversely, plain paper B is plain paper with a basis weight greater than M1 [g/m2]. Coated paper A is a coated paper with a basis weight of M2 [g/m2] or less, and conversely, coated paper B is a coated paper with a basis weight greater than M2 [g/m2].

As mentioned above, synthetic paper is a predetermined sheet type because it has higher electrical resistivity and is more easily charged than plain or coated paper. Plain paper A with a basis weight of M1 [g/m2] or less and coated paper A with a basis weight of M2 [g/m2] or less are thin paper and easily charged with high electrical resistivity, and therefore are predetermined sheet types. Conversely, plain paper B with a basis weight greater than M1 [g/m2] and coated paper B with a basis weight greater than M2 [g/m2] are different sheet types from the predetermined sheet types because they are not thin paper and have low electrical resistivity and are difficult to be charged.

If the sheet type information obtained in step S2 above is for a predetermined sheet type (first sheet) (S3 YES), proceed to step 11. Then, it determines (S11) whether the sheet type is, for example, plain paper A or coated paper A and whether the humidity detected by the humidity sensor 121 is below the set threshold H [%] (for example, 20 [%]). If the humidity as environment information is less than the set threshold, the environment information is the first environment information, and if the humidity as environment information is greater than the set threshold, the environment information is the second environment information which is more difficult to power down than the first environment information.

Specifically, in the case of plain paper A and coated paper A, the operation and deactivation of static remover are controlled appropriately according to humidity, since high humidity does not result in enough charge to pose a problem in actual use of the image forming apparatus 100 with respect to sheet feeding and stacking. In the case of plain paper A and coated paper A, if the humidity is below the set threshold H [%], the paper is easily charged, and if the humidity is greater than the set threshold H [%], the paper is difficult to be charged and the amount of charge is not high enough to cause problems in actual use.

Therefore, when the sheet type is synthetic paper, or when the humidity is below the set threshold H for plain paper A or coated paper A (S11 YES), the sheet S is passed (fed) first (S5). Then, when the sheet S passes through the fixing device 12 and the leading edge of the sheet S reaches the sheet detection sensor 28, the sheet detection sensor 28 is turned on (S6).

When the sheet detection sensor 28 is turned on, the controller 120 starts generating (outputting) ions by the static removing portion 27 and directs the ions toward the sheet S discharged from the discharge roller pair 21 (S7). In other words, ion emission from the static removing portion 27 begins at the timing when the leading edge of the sheet S reaches the sheet detection sensor 28 located at the paper discharge port. It then determines whether or not there is a next print job (S8), and if there is a next print job (S8 YES), it stops the generation (output) of static removing portion 27 ions (S9) and returns to step S3. If there is no next print job (S8 NO), the generation (output) of ions in the static removing portion 27 is stopped (S10) and this control is terminated.

On the other hand, if the sheet type information obtained in step S3 is not the predetermined sheet type, i.e., plain paper B or coated paper B (second sheet) (S3 NO), the sheet S is simply passed through (fed) (S4). Even if the acquired sheet type information is for a predetermined sheet type (S3 YES), if the sheet type is not a synthetic paper, or if it is a plain paper A or a coated paper A and the humidity is not less than the set threshold H (S11 NO), the sheet S is simply passed through (fed) (S4). That is, since the sheet S is difficult to be charged (low charge), the static removing portion 27 is left inactive. Then, similarly, it determines whether there is a next print job (S8), and if there is a next print job (S8 YES), it stops the generation (output) of static removing portion 27 ions (S9), based on the fact that a predetermined time has passed since it started operation, for example, and returns to step S3. If there is no next print job (S8 NO), similarly, for example, based on the fact that a predetermined time has passed since the start of operation, the generation (output) of ions in the static removing portion 27 is stopped (S10) and this control is terminated.

As explained above, in the second embodiment, the static removing portion 27 is operated for the sheet S that requires static removal according to not only the sheet type but also the humidity, which is environmental information. This reduces the number of inconsistencies, especially for sheets S discharged to the stack tray 24, even if the sheet S is a sheet that is easily charged. On the other hand, the static removing portion 27 is deactivated for sheets S that do not require static removal, depending not only on the sheet type but also on the environmental information, i.e., humidity. This can lengthen the life of the static removing portion 27 and reduce performance degradation, and can lengthen the maintenance interval. Therefore, the static removing portion 27 is operated only under conditions where the sheet is highly charged, enabling both long life of the static removing portion 27 and static removal performance, and since the static removing portion 27 has a longer life, running costs can also be reduced. And since the static removing portion 27 can be controlled to operate or not to operate according to sheet information (sheet type) without using an expensive and complicated configuration such as an electrostatic sensor, a simple configuration can be used to prevent cost increases.

The configuration, action, and effects of the second embodiment are the same as those of the first embodiment, and are therefore omitted from this description.

Possibilities of Other Embodiments

In the first and second embodiments described above, the static removing portion 27 is located downstream of the discharge roller pair 21 in the sheet feeding direction, near the so-called discharge port. However, the static removing portion can be placed at any position, not limited to this, as long as it is possible to irradiate ions to the feeding path for the sheet in the image forming apparatus 100. In particular, by removing static electricity from sheets fed from the sheet feeding portion 104 and sheets fed through the sheet feeding portion 103, static electricity can be reduced from sticking to the guides that form the feeding path, and paper jams can be reduced. When the static removing portion is placed inside the image forming apparatus 100, a sheet detection sensor may be placed upstream of the static removing portion in the sheet feeding direction, and the signal from the sensor may be used as a trigger to control the operation or deactivation of the static removing portion. This allows the static removing portion to be operated only for the required time, thereby extending its service life.

In the first and second embodiments, the static removing portion 27 is placed at only one location in the image forming apparatus 100, but it can be placed at multiple locations.

In the first and second embodiments, the image forming apparatus 100 is described as one in which the image forming apparatus 100 discharges and stacks the image-formed sheets S in the stack tray 24. However, it is not limited to this, and sheet processing devices such as so-called finishers, binding devices, closing devices, hole punching devices, etc., which apply processing to sheets S, may be arranged downstream of the image forming apparatus 100 in the sheet feeding direction. In this case, the static removing portion could be installed against the feeding path of the sheet processing unit or against the discharge port of the sheet processing unit. When such a sheet processing device is equipped with a static remover, the controller 120 of the image forming apparatus 100 may be used to control the operation and deactivation of the static removing portion arranged in the sheet processing device, without a controller in the sheet processing device. In short, a controller does not necessarily have to be provided as a static remover 30.

In the first and second embodiments, the sheet information is assumed to be first information when it is a predetermined sheet type and second information when it is another sheet type different from the predetermined sheet type. However, this is not limited to this. Sheet information may include not only sheet type, but also size information, etc. In other words, first information and second information may be distinguished, for example, by a difference in sheet type or sheet size, or by a difference in both.

In the second embodiment, the static removing portion 27 is activated when the sheet type in the sheet information is a predetermined sheet type (first information), such as plain paper A or coated paper A, and when the humidity is below the set threshold H. However, any sheet, not limited to this, may have the static removing portion 27 activated when the humidity is below the set threshold H and the static removing portion deactivated when the humidity is greater than the set threshold H. In other words, when a sheet is fed into the static removing portion 27, the static removing portion 27 may be activated when the environment in which the static remover 30 is placed is the first environment, and deactivated when the environment is the second environment, which is less electrically charged than the first environment. In the example of the second embodiment, the humidity is less than the set threshold H as the first environment (first environment information), and the humidity is greater than the set threshold H as the second environment (second environment information), but this is not limited to this. The first environment (first environment information) or the second environment (second environment information), for example, may be defined by a threshold set in a complex relationship between temperature and humidity.

In the first and second embodiments, the image forming apparatus 100 is described as a full-color laser printer, but it can also be a monochrome laser printer, a color or monochrome multifunction printer, a FAX, etc.

The present invention can also be realized by supplying a program realizing one or more functions of the above embodiments to a system or device via a network or storage medium, and processing in which one or more processors in a computer of the system or device read and execute the program. It can also be realized by a circuit (e.g., ASIC) that realizes one or more functions.

The present embodiment allows for longer maintenance intervals without increasing costs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098907 filed on Jun. 14, 2021, which is hereby incorporated by reference herein in its entirety.

What is claimed is:

1. An image forming apparatus comprising:

a plurality of cassettes configured to accommodate a sheet;

a memory unit configured to memorize a kind of the sheet accommodated in the plurality of cassettes in association with each of the plurality of cassettes;

a feeding unit configured to feed the sheet accommodated in the plurality of cassettes;

an image forming unit configured to form an image on the sheet fed by the feeding unit;

an environment information detecting portion configured to detect an environment information;

an ion irradiation unit configured to irradiate the sheet, on which the image is formed by the image forming unit, with an ion in a non-contact state with respect to the sheet; and a controller configured to control the ion irradiation unit, wherein the controller determines whether or not to cause the ion irradiation unit to irradiate the sheet with the ion based on the environment information in a case in which the sheet is a first kind, and wherein the controller causes the ion irradiation unit not to irradiate the sheet with the ion irrespective of the environment information in a case in which the sheet is a second kind of which electrical resistivity is lower than that of the first kind.

2. The image forming apparatus according to claim 1, further comprising a sheet detecting portion disposed on an upstream side of the ion irradiation unit with respect to a feeding direction of the sheet and configured to detect presence/absence of the sheet, wherein the controller causes the ion irradiation unit to irradiate the sheet with the ion in response to detection of the presence of the sheet by the sheet detecting portion.

3. The image forming apparatus according to claim 1, wherein the environment information detecting portion includes a humidity sensor detecting a humidity as the environment information, and wherein the controller causes the ion irradiation unit to irradiate the sheet of the first kind with the ion when the humidity is less than a threshold value and causes the ion irradiation unit not to irradiate the sheet with the ion when the humidity is greater than the threshold value.

4. The image forming apparatus according to claim 1, wherein the sheet of the first kind is a synthetic paper.

5. The image forming apparatus according to claim 4, wherein the sheet of the second kind is a plain paper.

6. The image forming apparatus according to claim 1, wherein the sheet of the first kind is a sheet having a first basis weight, and wherein the sheet of the second kind is a sheet having a second basis weight smaller than the first basis weight.

7. The image forming apparatus according to claim 1, further comprising:

a discharging portion configured to discharge the sheet on which the image is formed by the image forming unit; and a sheet stacking portion configured to stack the sheet discharged by the discharging portion, wherein the ion irradiation unit is disposed on a downstream side of the discharging portion with respect to the feeding direction of the sheet.

* * * * *